US012728806B2

(12) United States Patent
Park et al.

(10) Patent No.: US 12,728,806 B2
(45) Date of Patent: Sep. 8, 2026

(54) POWER SUPPLY DEVICE AND POWER SUPPLY CONTROL METHOD OF POWER SUPPLY DEVICE

(71) Applicant: Samsung Electronics Co., Ltd., Suwon-si (KR)

(72) Inventors: Jongdo Park, Suwon-si (KR); Junghun Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 93 days.

(21) Appl. No.: 18/347,954

(22) Filed: Jul. 6, 2023

(65) Prior Publication Data

US 2023/0347842 A1 Nov. 2, 2023

Related U.S. Application Data

(63) Continuation of application No. PCT/KR2022/002072, filed on Feb. 11, 2022.

(30) Foreign Application Priority Data

Mar. 2, 2021 (KR) ........................ 10-2021-0027655

(51) Int. Cl.

*B60R 16/033* (2006.01)
*H02J 7/00* (2006.01)
*H02J 7/47* (2026.01)

(52) U.S. Cl.

CPC .............. *B60R 16/033* (2013.01); *H02J 7/47* (2026.01); *H02J 7/855* (2026.01)

(58) Field of Classification Search

CPC .................................................. H02J 7/00045
See application file for complete search history.

(56) References Cited

U.S. PATENT DOCUMENTS 10,582,388 B2 3/2020 Kim
10,759,300 B2 9/2020 Yi et al.
(Continued)

FOREIGN PATENT DOCUMENTS

JP 2019185739 A 10/2019
JP 2020086540 A 6/2020
(Continued)

OTHER PUBLICATIONS

Age Motors, Can it turn on and off with just the ignition? Utilizing an idle smartphone as a navigation system navigation system (feat. TMap), Online: https://www.youtube.com/watch?v=Bd3a5XeIASQ, Aug. 31, 2018, 4 pages.

(Continued)

*Primary Examiner* — Daniel Kessie
(74) *Attorney, Agent, or Firm* — Nixon & Vanderhye P.C.

(57) ABSTRACT

A power supply device powered by a battery of a vehicle according to various embodiments may comprise: a first interface configured to communicate with an external device; a power supply switch connected to a charging adapter configured to transform power supplied from the battery to control power output; and a processor operatively connected to the first interface and the power supply switch, wherein the first interface includes a USB Type-C interface for configuration channel (CC) communication between the external device and an electronic device; and the processor may be configured to: detect connection of the external device through the first interface, detect a first interrupt or a second interrupt related to vehicle power on/off from the vehicle, control power supply to the external device through the power supply switch, and control the power supply device to transmit a first signal or a second signal for controlling the power on/off of the external device to the (Continued)

external device through the first interface in response to the first interrupt or the second interrupt.

20 Claims, 7 Drawing Sheets

(56) References Cited

U.S. PATENT DOCUMENTS

| | | | | |
|---|---|---|---|---|
| 10,771,557 | B2 | 9/2020 | Moon | |
| 2015/0089261 | A1* | 3/2015 | Segawa | G06F 1/324<br>713/323 |
| 2017/0054310 | A1* | 2/2017 | Chen | H02J 7/00 |
| 2018/0022299 | A1* | 1/2018 | Han | B60R 16/033<br>701/36 |
| 2018/0067875 | A1 | 3/2018 | Ghosh et al. | |
| 2020/0150976 | A1* | 5/2020 | Lee | G06F 1/266 |
| 2021/0029282 | A1 | 1/2021 | Degura | |

FOREIGN PATENT DOCUMENTS

| | | | |
|---|---|---|---|
| JP | 2021016281 | A | 2/2021 |
| KR | 101359072 | B1 | 2/2014 |
| KR | 101545317 | B1 | 8/2015 |
| KR | 20180051905 | A | 5/2018 |
| KR | 20180058958 | A | 6/2018 |
| KR | 101894918 | B1 | 9/2018 |
| KR | 20190109152 | A | 9/2019 |
| KR | 102092567 | B1 | 3/2020 |
| KR | 102194306 | B1 | 12/2020 |
| KR | 20220013110 | A | 2/2022 |

OTHER PUBLICATIONS

International Search Report for PCT/KR2022/002072 mailed May 16, 2022, 3 pages.

Written Opinion of the ISA for PCT/KR2022/002072 mailed May 16, 2022, 5 pages.

Korean Office Action dated Aug. 25, 2025 for KR Application No. 10-2021-0027655.

* cited by examiner

FIG. 4

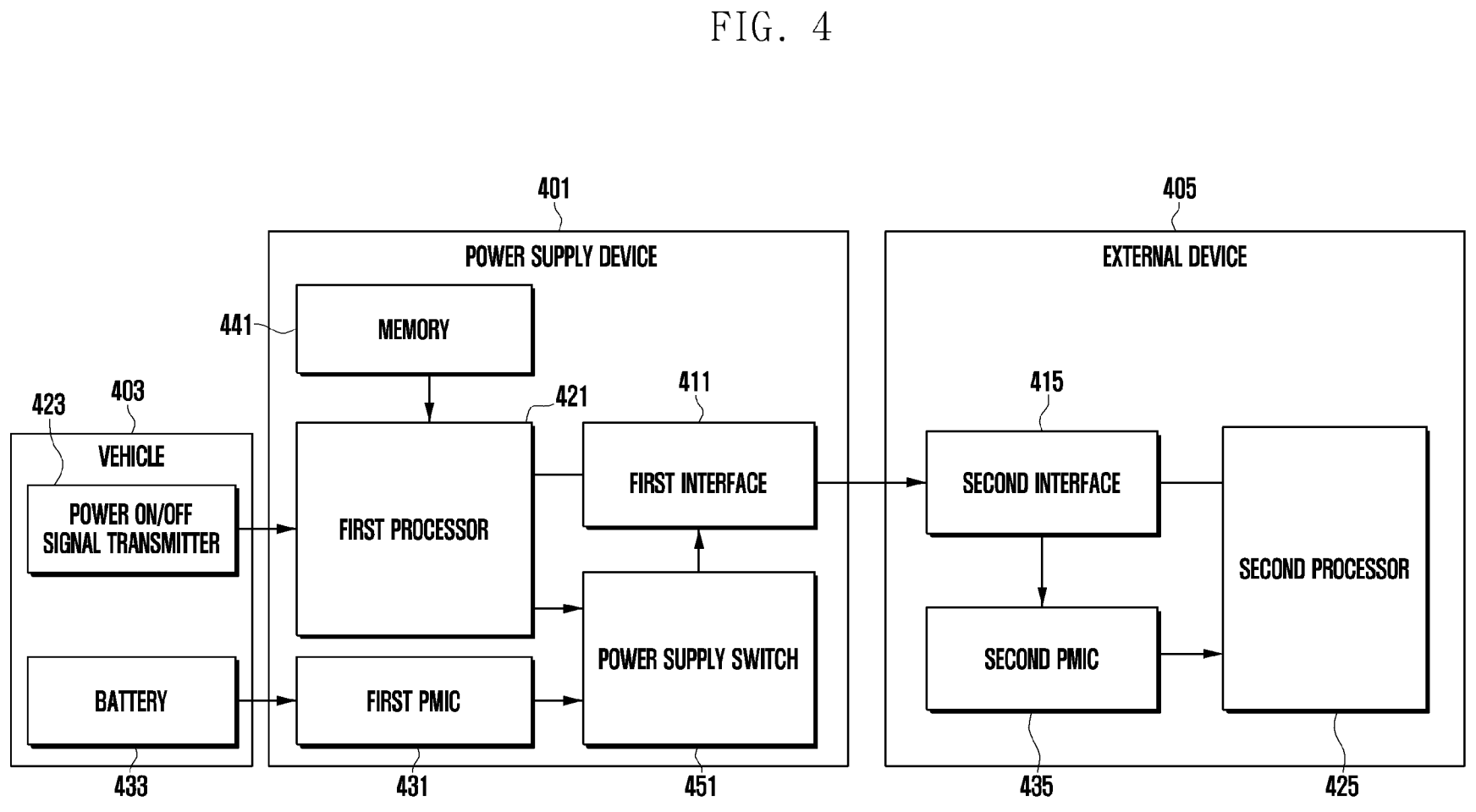

405 EXTERNAL DEVICE
415 SECOND INTERFACE
435 SECOND PMIC
425 SECOND PROCESSOR

401 POWER SUPPLY DEVICE
441 MEMORY
421 FIRST PROCESSOR
431 FIRST PMIC
411 FIRST INTERFACE
451 POWER SUPPLY SWITCH

403 VEHICLE
423 POWER ON/OFF SIGNAL TRANSMITTER
433 BATTERY

POWER SUPPLY DEVICE AND POWER SUPPLY CONTROL METHOD OF POWER SUPPLY DEVICE

CROSS-REFERENCE TO RELATED APPLICATIONS

This application is a continuation of International Application No. PCT/KR2022/002072 designating the United States, filed on Feb. 11, 2022, in the Korean Intellectual Property Office and claiming priority to Korean Patent Application No. 10-2021-0027655, filed on Mar. 2, 2021, in the Korean Intellectual Property Office, the disclosures of each of which are incorporated by reference herein in their entireties.

BACKGROUND

Field

The disclosure relates to a power supply device, for example, a power supply device for supplying power to an external device and a power supply control method of the power supply device.

Description of Related Art

A vehicle battery can supply power to a variety of electronic devices. For example, a navigation or a driving record measuring device may receive power from a vehicle battery. A power supply device may support standardized interfaces such as a universal serial bus (USB) for connecting with an external device and provide additional interfaces other than USB inside the power supply device for data communication with external devices.

Power may be supplied to the external device through a USB connector provided in a power supply device to which power from a vehicle battery is connected. The power supply device can supply power necessary for driving an external device through a USB connector. In addition, a power supply device connected to an external device using the USB Type-C standard can transmit/receive a control signal to/from an external device through a configuration channel (CC) defined in the USB Type-C standard. Conversely, an electronic device connected to the power supply device may transmit/receive a control signal to/from the power supply device through a configuration channel (CC) defined in the USB Type-C standard.

A connection between the power supply device and the external device may be made through a USB connector provided in the power supply device and the power supply device may supply power necessary for driving the external device through the USB connector as the external device connected through the connector does not have a separate power supply. In addition, a power supply device connected to an external device using the USB Type-C standard may transmit/receive a control signal to/from the external device through a configuration channel (CC) defined in the USB Type-C standard.

The background technology of the above disclosure are simply for the purpose of improving the understanding of the background of the present disclosure, and should not be taken as acknowledging that they correspond to the prior art already known to those skilled in the art.

In the case that an external device is connected to a vehicle battery that is used as a constant power source, it may be difficult for the user to turn off the power of the external device from the outside unless a power button provided on the external device is used or the power connection is disconnected through a cable. Accordingly, in the case that the external device is not turned off but turned on, power consumption may continue to occur.

SUMMARY

Embodiments of the disclosure may reduce power consumption by turning off the power of an external device according to the vehicle power on/off state without using a power button of the external device or removing a cable.

A power supply device powered by a battery of a vehicle according to various example embodiments may comprise: a first interface for communication with an external device; a power supply switch connected to a charging adapter configured to transform power supplied from the battery to control power output; and a processor operatively connected to the first interface and the power supply switch, wherein the first interface includes a universal serial bus (USB) Type-C interface for configuration channel (CC) communication between the external device and an electronic device; wherein the processor may be configured to: detect connection of the external device through the first interface, detect a first interrupt or a second interrupt related to vehicle power on/off from the vehicle, control power supplied to the external device through the power supply switch, and control to transmit a first signal or a second signal for controlling the power on/off of the external device to the external device through the first interface in response to the first interrupt or the second interrupt.

According to various example embodiments, a method of operating a power supply device installed in a vehicle may include: detecting connection of an external device; detecting vehicle power on/off; and transmitting a signal corresponding to vehicle power on/off to an external device, wherein the signal corresponding to vehicle power on/off includes a first signal and/or a second signal where the first signal includes a VID (Vendor ID)/PID (Product ID) signal related to power off and the second signal includes a VID (Vendor ID)/PID (Product ID) signal related to power on.

According to various example embodiments, the power of the external device may be controlled according to the power on/off state of the vehicle without the user's controlling the external device or removing the charging cable separately. In this way, the power consumption of the battery may be saved, and usability may be improved as power control of external device is performed. In addition, efficient power management may be enabled and stability in circuit of an external device may be secured by preventing or reducing sudden power off of the external device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a block diagram illustrating various components and connection states of the power supply device and the external device according to various embodiments;

DETAILED DESCRIPTION

Figure 1:
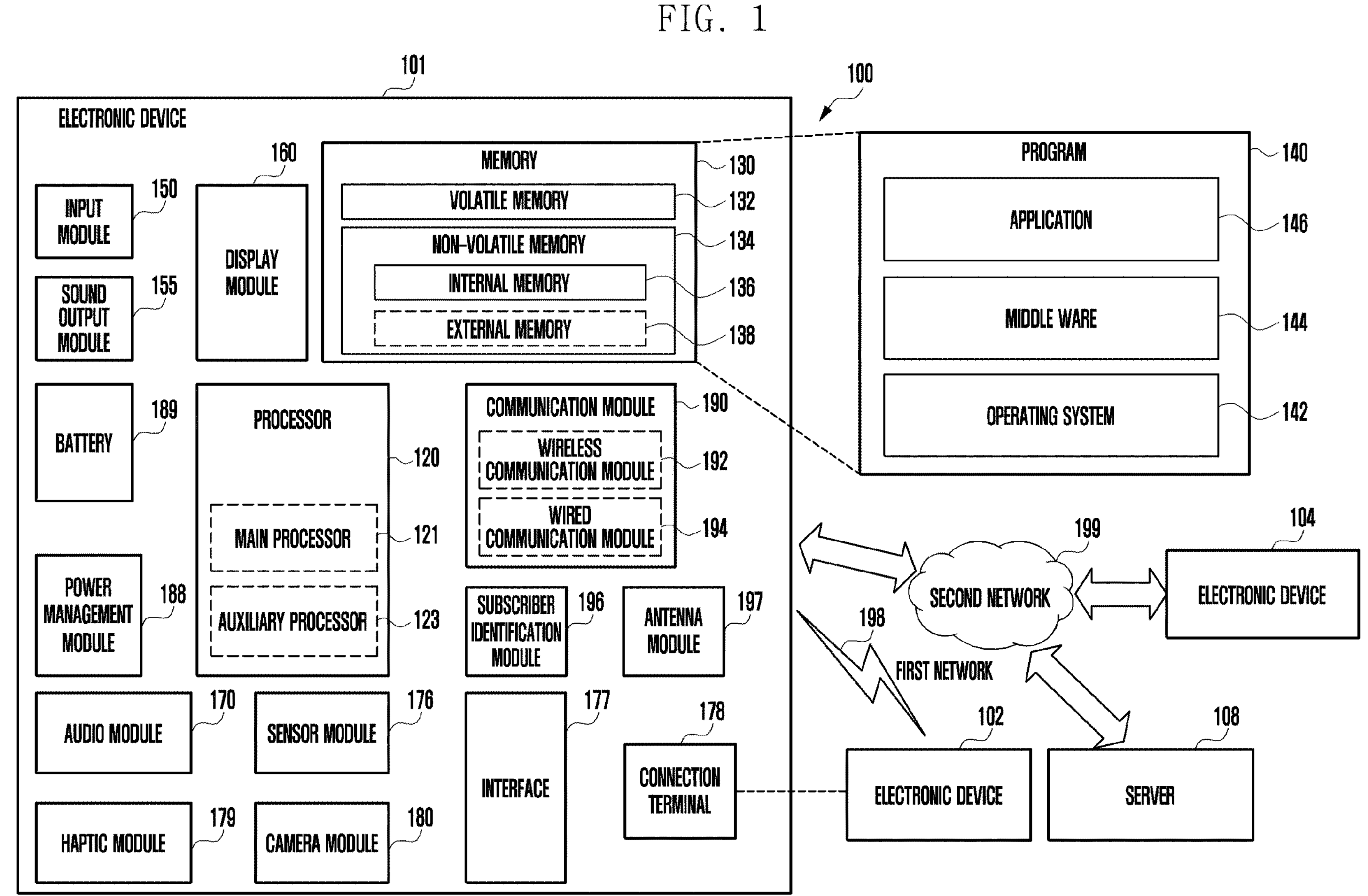
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108 For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
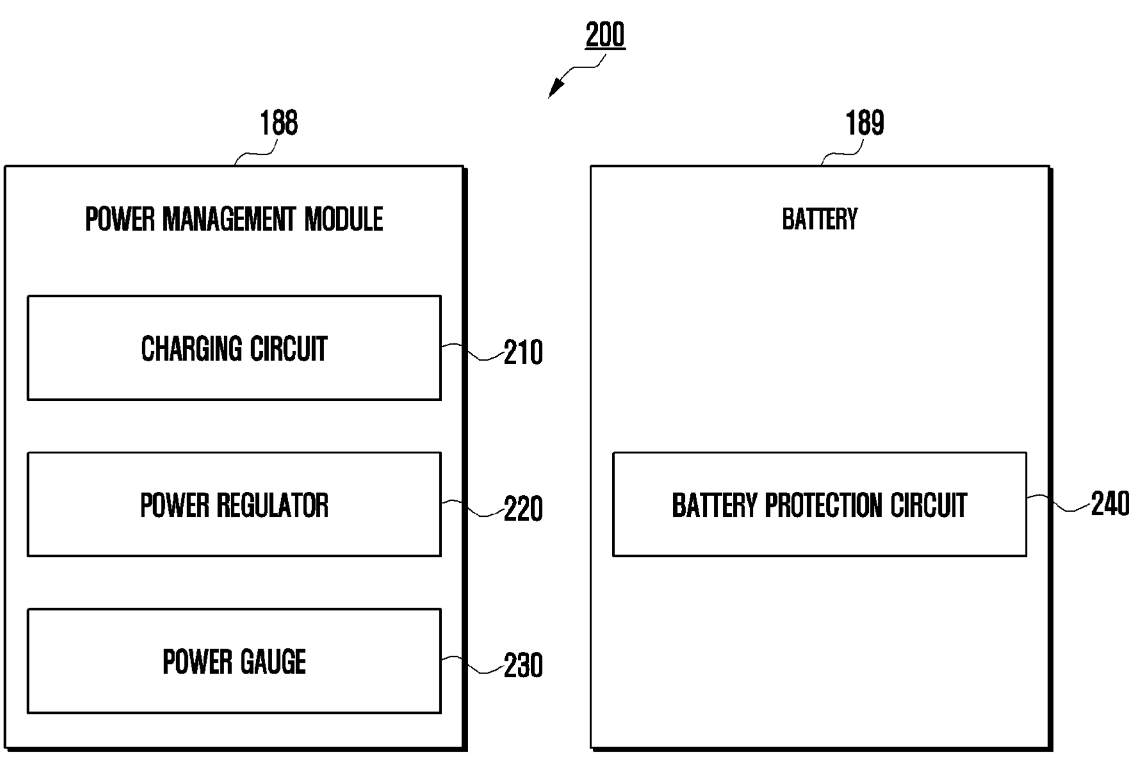
FIG. 2 is a block diagram illustrating an example configuration of a power management module and a battery according to various embodiments.

FIG. 2 is a block diagram 200 illustrating an example configuration of a power management module 188 and a battery 189 according to various embodiments. With reference to FIG. 2, the power management module 188 may include a charging circuit 210, a power regulator (e.g., including various circuitry) 220, and/or a power gauge (e.g., including various circuitry)230. The charging circuit 210 may charge the battery 189 using power supplied from an external power source for the electronic device 101. According to an embodiment, the charging circuit 210 may identify a charging method (e.g., a normal charging or a rapid charging) based on at least a portion of an external power source (e.g., a power adapter, a USB or a wireless charging), a size of power supplied from the external power source (e.g., about 20 watts or more), or properties of the battery 189, and it may charge the battery 189 using the identified charging method. The external power source may be connected to the electronic device 101, for example, by wire through a connecting terminal 178 or wirelessly through an antenna module 197.

The power regulator 220 may include various circuitry and generate a plurality of powers having different voltages or different current levels by, for example, adjusting a voltage level or a current level of power supplied from an external power source or the battery 189. The power regulator 220 may adjust the power of the external power supply or the battery 189 to a voltage or a current level suitable for each of some of the components included in the electronic device 101. According to an embodiment, the power regulator 220 may be implemented in the form of a low drop out (LDO) regulator or a switching regulator. The power gauge 230 may measure usage state information (e.g., capacity of the battery 189, number of charge/discharge cycles, voltage, or temperature) of the battery 189.

The power management module 188, for example, may determine the charging state information (e.g., life expectancy, overvoltage, undervoltage, overcurrent, overcharge, overdischarge, overheating, short circuit, or swelling) related to the charging of the battery 189 using the charging circuit 210, the voltage regulator 220, and/or the power gauge 230, based at least in part on the measured state of use information. The power management module 188 may determine whether the battery 189 is normal or abnormal based at least in part on the determined state of charge information. In the case that the state of the battery 189 is determined to be abnormal, the power management module 188 may adjust charging of the battery 189 (e.g., reduce charging current or voltage, or stop charging). According to an embodiment, at least a portion of the functions of the power management module 188 may be performed by an external control device (e.g., the processor 120).

The battery 189 may include a battery protection circuit module (PCM) 240 according to an embodiment. The battery protection circuit 240 may perform one or more of various functions (e.g., a pre-blocking function) to prevent and/or reduce deterioration or burnout of the battery 189. The battery protection circuit 240, additionally or alternatively, may be configured as at least a portion of the battery management system (BMS) capable of performing various functions including cell balancing, measuring the capacity of a battery, measuring the number of charge/discharge times, measuring temperature, or measuring voltage.

According to an embodiment, at least a portion of the information on the state of use or the state of charge of the battery 189 may be measured using a corresponding sensor (e.g., a temperature sensor) of the sensor module 176, a power gauge 230, or a power management module 188. According to an embodiment, the corresponding sensor (e.g., a temperature sensor) of the sensor module 176 may be included as part of the battery protection circuit 240 or disposed near the battery 189 as a separate device.

Figure 3:
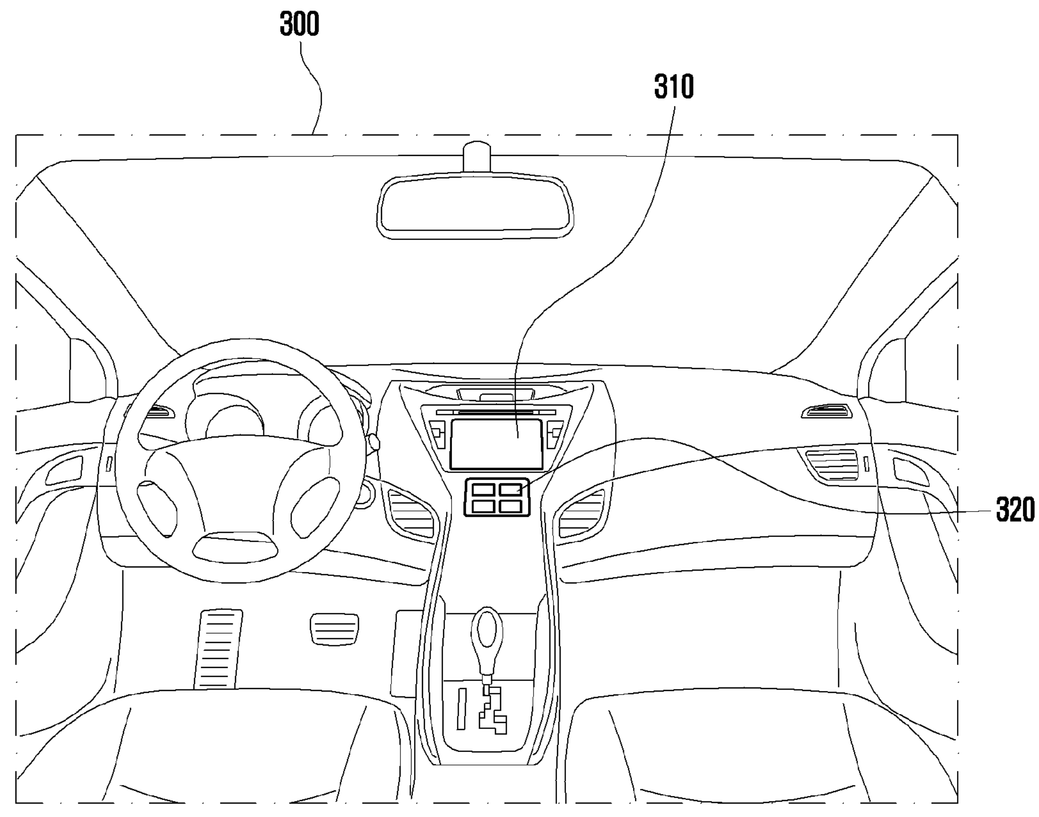
FIG. 3 is a diagram illustrating an example in which a power supply device and an external device are used inside a vehicle according to various embodiments.

FIG. 3 is a diagram illustrating an example in which a power supply device and an external device are used inside a vehicle according to various embodiments.

According to various embodiments, an external device 310 (e.g., a navigation, a vehicle driving record measuring device) not having an internal power supply may be connected to the battery of the vehicle 300 while the vehicle 300 is running. For example, when connecting the navigation to the vehicle battery, it may be difficult to turn off the power of the navigation from the outside unless the power off key of the navigation is used or the power from the battery is disconnected separately. In addition, there may also be a method of sensing the voltage of the vehicle battery until it reaches a critical point and turning off navigation when the voltage exceeds the critical point. However, this may cause relatively high power consumption because it is necessary to wait until the voltage of the vehicle battery reaches a critical point.

According to various embodiments, the battery of the vehicle 300 may supply power to the external device 310 (e.g., a navigation, a vehicle driving record measuring device) not having the internal power supply. In addition, the power supply device 320 may receive battery power of the vehicle 300 and supply the received battery power of the vehicle 300 to other external electronic device (e.g., a tablet) (not shown) using a connector (e.g., a USB Type-C connector) of the power supply device 320. For example, the battery of the vehicle 300 may supply power to a navigation device installed inside the vehicle. In addition, the external electronic device (not shown) may have a detachable internal battery and may be connected to the power supply device 320. In the case that an external electronic device (not shown) is connected to power supply device 320, even when a battery of an external electronic device (not shown) is detached, power may be supplied and operated.

According to various embodiments, while the vehicle 300 is running, an external device (e.g., a smartphone, a tablet, a wireless charging pad) having an internal power supply may be connected to the battery of the vehicle 300. In this case, unlike the external device having no internal power supply in the battery, the external device having internal power supply may be connected to the vehicle battery for charging as well as operation.

According to various embodiments, in the case of an external device having an internal power supply, even if the power of the vehicle battery is suddenly turned off, charging may be stopped, but the possibility of sudden power off of the external device may be low because the internal power supply is present. In the case of an external device that does not have an internal power supply, the external device may be suddenly powered off when the power of the vehicle battery is turned off. In this case, the life expectancy of the external device and the power supply may be reduced. In addition, internal circuit stability of the power supply may also deteriorate. FIG. 4 to FIG. 7 below will explain in detail a power supply device and a power control method of the power supply device to address these problems.

FIG. 4 is a diagram illustrating various components and connection states of the power supply device and the external device according to various embodiments.

According to various embodiments, the power supply device 401 may include a first interface 411, a first processor (e.g., including processing circuitry) 421, a first power management integrated circuit (PMIC) (e.g., which may include a charging adapter) 431, a memory 441, and a power supply switch 451. The power supply device 401 may transmit/receive the data through the interface (e.g., the first interface 411 and the second interface 415) between the external device 405 and the device. In addition, after transforming the voltage through the first PMIC 431, power may be transmitted to the external device 405 through the power supply switch 451. The memory 441 may include a device ID (e.g., Vendor ID and/or Product ID) separately.

According to various embodiments, the power supply device 401 may include further at least a portion of the configurations and/or functions of the electronic device 101 of FIG. 1. At least a portion of the components of power supply device 401 shown (or not shown) may be operatively, functionally and/or electrically connected each other.

According to various embodiments, the first processor 421 may include one or more processors as a configuration capable of performing calculations or data processing related to control and/or communication of each component of the power supply device 401. The first processor 421 may include at least a portion of the components and/or functions of the processor 120 of FIG. 1.

According to various embodiments, the external device 405 electrically connected to the power supply device 401 and capable of transmitting and receiving data may include a second interface 415, a second processor (e.g., including processing circuitry) 425 and a second PMIC 435.

According to various embodiments, the first processor 421 of the power supply device 401 may detect the connection of the external device 405 through a USB interface (e.g., the first interface 411). In addition, the first processor 421 may detect the power on/off of the vehicle 403 through a signal received from the vehicle 403. The first processor 421 may detect a first interrupt or a second interrupt according to vehicle power on/off 403 and transmit a corresponding first or second signal to the external device 405. The first processor 421 may control power supply to the external device 405 through the power supply switch 451 and control power on/off of the external device 405 through the first interface 411.

According to various embodiments, in the case that the power supply device 401 and the external device 405 are electrically connected through the interfaces 411 and 415, the device ID included in the memory 441 of the power supply device 401 and other related data may be transmitted to the external device 405. The second processor 425 may read the information received from the power supply device 401. The second processor 425 may read information included in the device ID, such as the type of power supply device 401, functional specifications, coupling direction, and/or information related to the existence of a power supply source. Based on the information about the identified power supply device 401, the second processor 425 may control some functions of the external device 405, such as executing software suitable for the function of the connected power supply device 401. The type of device ID and the process of confirming it will be described in greater detail below with reference to FIG. 5.

According to various embodiments, if the power supply device 401 and the external device 405 are electrically connected, the power supply device 401 may determine whether the external device 405 includes a power supply source. In the case that the external device 405 includes a power supply source, the first processor 421 of the power supply device 401 may identify the power of the battery (power supply source) of the external device 405 and supply power.

According to various embodiments, in the case that the external device 405 does not include a power supply source, the power supply device 401 may supply power to the external device 405 through the power supply switch 451. However, in this case, when the power of the vehicle 403 is turned off, the power of the external device 405 may also be turned off immediately. A sudden power off phenomenon may harm the life expectancy of the external device 405 and the power supply device 401. To prevent and/or reduce this, the power off of the external device 405 may be induced in advance before the power of the vehicle 403 is turned off. This process will be described in detail in FIG. 6.

According to various embodiments, the first processor 421 of the power supply device 401 may determine in advance whether the power of the vehicle 403 is turned on/off through the power on/off signal transmitter 423 of the vehicle 403. In the case that the first processor 421 receives the first interrupt according to the power off signal of the vehicle 403, the first processor 421 may predict that the battery of the vehicle 403 will be turned off and transmit a first signal corresponding thereto to the external device 405. The first interrupt may include a signal according to the power off of the vehicle. The first signal may include a power off Vendor ID (VID)/Product ID (PID) signal. Transmission of the first signal may be performed through configuration channel (CC) communication through the first interface 411. Configuration channel (CC) communication between the power supply device 401 and the external device 405 will be described in detail in FIG. 5.

According to various embodiments, the external device 405 may receive a power off Vendor ID (VID)/Product ID (PID) signal through the second interface 415. At this time, the second processor 425 of the external device 405 may control the external device 405 to switch to a stand by state for power off. The first processor 421 of the power supply device 401 may cut off the power supplied to the external device 405 by opening the power supply switch 451 after a predetermined period (e.g., 30 seconds) elapses since transmitting the power off Vendor ID (VID)/Product ID (PID) signal.

According to various embodiments, the first processor 421 of the power supply device 401 may determine in advance whether the power of the vehicle 403 is turned on or off through the power on/off signal transmitter 423 of the vehicle 403. Upon receiving the second interrupt according to the power on signal of the vehicle 403, the first processor 421 may predict that the battery of the vehicle 403 will be turned on and supply power to the external device 405 by shorting the power supply switch 451. At this time, the second PMIC 435 of the external device 405 may receive power and control the power of the external device 405 to be in a stand by state so that it can be operated at any time.

According to various embodiments, the first processor 421 of the power supply device 401 may transmit a power on Vendor ID (VID)/Product ID (PID) signal to the external device 405 when a predetermined period (e.g., 30 seconds) elapses after shorting the power supply switch 451. The power on Vendor ID (VID)/Product ID (PID) signal may control power of the external device 405 to be turned on. Alternatively, even if a predetermined period (e.g., 30 seconds) does not elapse after the power supply switch 451 is shorted, the first processor 421 may transmit a power on Vendor ID (VID)/Product ID (PID) signal to the external device 405 according to a user command. When receiving a power on Vendor ID (VID)/Product ID (PID) signal, the second interface 415 of the external device 405 may control the power of the external device 405 to be turned on through the PMIC.

According to various embodiments, the charging adapter (e.g., PMIC) 431 may receive power from the battery 433 of the vehicle 403 and transform it to supply power to the external device 405. Power supplied from the battery 433 of the vehicle 403 may have a value of about 12V or 18V. The charging adapter (e.g., PMIC) 431 may transform this voltage to about 5V and supply it to the external device 405 through the power supply switch 451.

Figure 5:
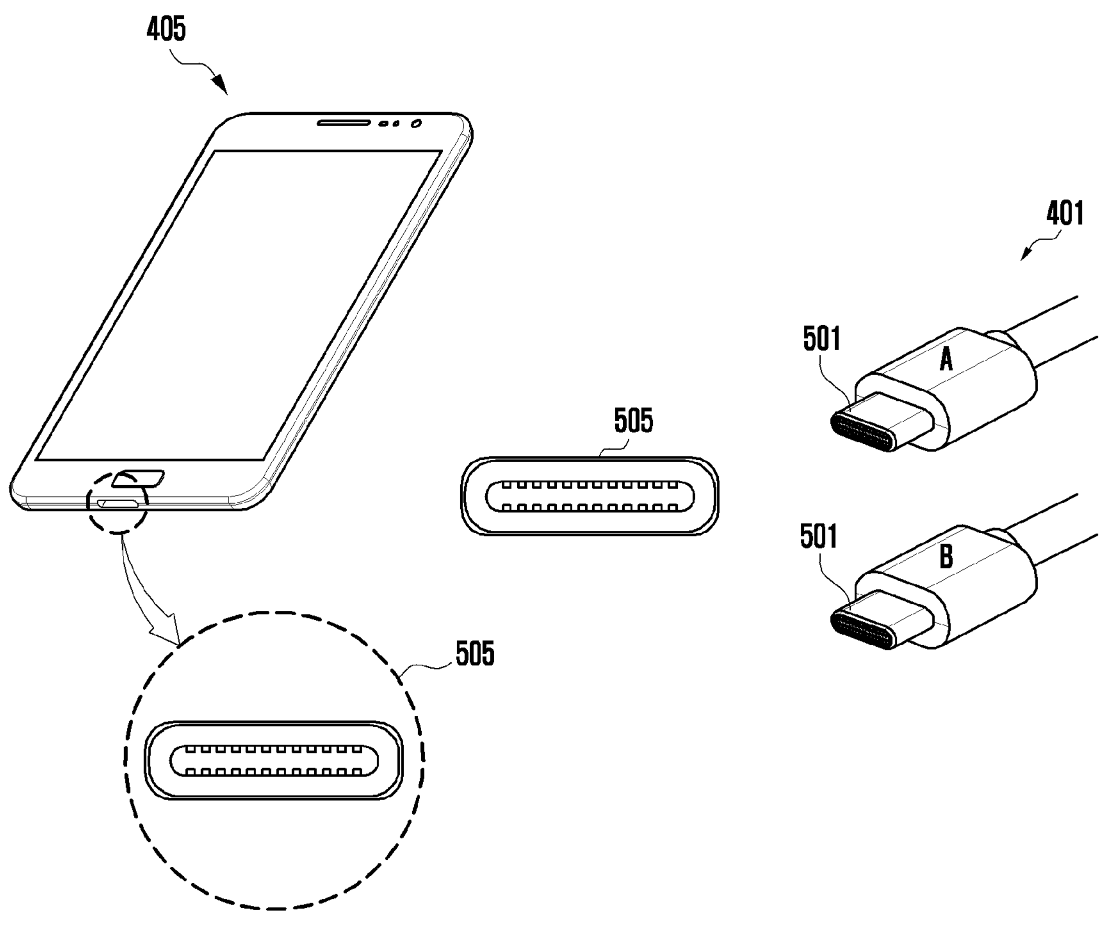
FIG. 5 is a diagram illustrating an example connector and a pin structure of a power supply device according to various embodiments.

FIG. 5 is a diagram illustrating a connector and a pin structure of a power supply device according to various embodiments.

According to various embodiments, the connector 501 of the power supply device 401 may be inserted into the hole 505 of the external device 405. The connector 501 of the power supply device 401 may be accommodated through the hole 505 of the external device 405 to physically contact the external device. As they are physically contacted, the external device 405 and the power supply device 401 may be electrically connected. The connector 501 according to an embodiment may correspond to a structure into which a USB Type-C connector can be inserted.

According to various embodiments, the connector 501 of the power supply device 401 and the hole structure of the external device 405 may have a reversible structure. The hole 505 of the external device 405 may be symmetrical each other with respect to a first direction perpendicular to the direction in which the power supply device 401 is inserted (e.g., a direction from bottom to top of the external device 405) and a second direction opposite to the first direction. For example, with reference to FIG. 5, one side (e.g., side A) of the connector 501 of the power supply device 401 may be inserted into the hole 505 of the external device 405 in a direction parallel to the front side (e.g., the side where the display is located) of the external device 405. For another example, the other side (e.g., the side B) of the connector 501 of the power supply device 401 may be inserted in a direction parallel to the front side of the external device 405.

According to various embodiments, configuration channel 1 (CC1) and configuration channel 2 (CC2) terminals included in the USB Type-C standard may be used as ports for detecting connector insertion/separation and identifying a connector connection mode. For example, when the external device 405 and the power supply device 401 are connected through the connector 501, electrical signals (e.g., digital ID or resistance ID) may be exchanged through the CC1 and CC2 terminals, and accordingly, the insertion or removal of the external device 405 and the power supply device 401 may be detected. The external device 405 may control the connector connection mode to be configured to operate in a downstream facing port (DFP) mode (e.g., data providing mode), an upstream facing port (UFP) mode (e.g., data receiving mode) and/or a sink mode (e.g., a mode in which power is supplied) based on the value detected in at least one of CC1 and CC2.

According to various embodiments, the power supply device 401 may be electrically connected to the external device 405 through various input/output interfaces (e.g., a peripheral component interconnect express (PCIe) interface, a lightning interface, or a USB interface).

According to various embodiments, the power supply device 401 may be electrically connected to the external device 405 through the connector 501. For example, the connector 501 of the power supply device 401 may be accommodated through the hole 505 of the external device 405 to physically contact the connector 501 of the power supply device 401, and in accordance with the physical contact the power supply device 401 and the external device 405 may be electrically connected.

According to various embodiments, the first processor 421 of the power supply device 401 may detect that the external device 405 is connected to the connector 501. The first processor 421 may identify the type of signal detected from the CC pin as the external device 405 is coupled to the connector 501, and based on the type of signal (e.g., V/PID), information about the external device 405 may be identified. The first processor 421 may supply power for the operation of the external device 405 to the second PMIC 435 of the external device 405 through the power supply switch 451.

According to various embodiments, the second processor 425 of the external device 405 may perform a series of preparation operations (e.g., enumeration) to transmit data between the power supply device 401 and the external device 405 when the external device 405 is connected to the connector 501. The second processor 425 of the external device may obtain information of the power supply device 401 while performing a series of preparation operations for data transmission between the power supply device 401 and the external device 405. The information of the power supply device 401 may include device descriptor information including vendor identification (VID) indicating manufacturer information of the power supply device 401, product identification (PID) indicating the product, the number of interfaces supported by the power supply device 401, sample rate, channel information, and/or bit rate.

In an embodiment, when the connector 501 is inserted or electrically connected to the external device 405, the first processor 421 may transfer information (e.g., VID and PID information) of the power supply device 401 to the second interface 415 through the first interface 411.

In an embodiment, the first interface 411 may identify whether the second interface 415 is activated or not to recognize the connection of the external device 405 by accessing at designated time intervals based on the VID and PID information of the power supply device 401. In the case that at least some other pieces of information of the power supply device 401, for example, the number of interfaces supported by the power supply device 401, sample rate, channel information, and/or bit rate, are obtained, the second interface 415 for connection with the external device 405 may be activated. The first processor 421 may transmit a V/PID and a power on/off V/P signal to the external device 405 based on activation of the second interface for recognizing the connection of the external device 405.

According to various embodiments, the first processor 421 of the power supply device 401 may detect whether the external device 405 is connected through the first interface 411. According to various embodiments, the second processor 425 may request identification information of the connected power supply device 401 in response to the connection of the external device 405 to the first interface 411. That is, the second processor 425 may request identification information from the connected external power supply device 401. The power supply device 401 may transmit its own identification information to the external device 405 in response to the identification information request. The identification information may include, for example, at least one of a product ID and manufacturer information of the power supply device 401. The ID sensing unit 445 may recognize identification information transmitted by the power supply device 401.

According to various embodiments, the ID sensing unit 445 may determine whether the recognized identification information matches pre-stored identification information of a specific power supply device 401. As a result of the determination, when the recognized identification information matches the stored identification information of the specific power supply device 401, the second processor 425 may control and connect the second interface 415 and the second PMIC 435 to the first interface 411 and the power supply switch 451.

According to various embodiments, the external device 405 may include a portable electronic device including a detachable internal battery, such as a smart phone or a tablet PC. In addition, the external device 405 may include a vehicle navigation system and a vehicle record measuring device that does not include an internal battery. The external device may have a hole 505 to which an accessory device (e.g., a power supply) may be connected. According to an embodiment, the external device 405 may be connected to an accessory device through the connector 501 and transmit/receive data (e.g., multimedia data such as audio data, other control commands, etc.) to/from the connected accessory device.

According to various embodiments, the external device 405 may include an opening formed on one surface of a housing and a hole connected to the opening, and the connector 501 may be disposed inside the hole. As shown in FIG. 5, an opening and a hole 505 may be formed on one lower surface of the housing of the external device 405 and the connector 501 may be disposed therein, but the placement position of the connector 501 is not limited thereto and may be disposed on the other side of the housing of the external device 405.

A connector 501 of an accessory device may be inserted into the hole 505 of the external device 405. Although there is no limitation on the type of accessory device, a case in which a connected accessory device is a power supply device for supplying power will be described as an example.

According to various embodiments, the connector 501 may correspond to a connector conforming to a universal serial bus (hereinafter USB) standard, and more specifically, may be a connector conforming to a USB Type-C standard. In addition, the connector 501 may transmit the data (e.g., data transmitted from the configuration channel 1 (CC1) pin and configuration channel 2 (CC2) pin included in the type C standard) that can be used to detect automatically which devices are connected between a source (a device that provides power) and a sink (a device that receives power) or a downstream facing port (DFP, a device that provides data) and an upstream facing port (UFP, a device that receives data).

In the case that the external device 405 and the accessory device are connected, electrical signals (e.g., digital ID or resistance ID) may be exchanged through the CC1 and CC2 terminals, and the external device 405 may detect the type of other connected devices accordingly. In addition, according to the detection result of the connected device, the external device 405 may operate in a downstream facing port (DFP) mode or an upstream facing port mode (UFP).

According to various example embodiments, a power supply device (e.g., the power supply device 401 of FIG. 4) powered by a battery of a vehicle may comprise: a first interface (e.g., a first interface 411 of FIG. 4) configured to communicate with an external device (e.g., the external device 405 of FIG. 4); a power supply switch (e.g., a power supply switch 451 of FIG. 4) connected to a charging adapter configured to transform power supplied from the battery to control power output; and a processor (e.g., a first processor 421 of FIG. 4) operatively connected to the first interface and the power supply switch, wherein the first interface includes a USB Type-C interface for configuration channel (CC) communication between the external device and an electronic device; and the processor may be configured to: detect connection of the external device through the first interface, detect a first interrupt or a second interrupt related to vehicle power on/off from the vehicle, control power supply to the external device through the power supply switch, and control to transmit a first signal or a second signal for controlling the power on/off of the external device to the external device through the first interface in response to the first interrupt or the second interrupt.

According to various example embodiments, based on receiving the first interrupt, the processor may be configured to transmit the first signal to the external device through the first interface.

According to various example embodiments, the first signal may include a power off Vendor ID (VID)/Product ID (PID) signal.

According to various example, the processor may be configured to control the external device to switch to a power off state or a stand by state for power off through the first signal.

According to various example embodiments, the processor may be configured to cut off power supply to an external device by opening a power supply switch based on a specified period elapsing based on transmitting the first signal.

According to various example embodiments, the second interrupt may include a signal according to power on of the vehicle.

According to various example embodiments, based on receiving the second interrupt, the processor may be configured to supply power to an external device by closing a power supply switch.

According to various example embodiments, the processor may be configured to close the power supply switch and transmit the second signal to the external device through the first interface based on a specified period elapsing.

According to various example embodiments, the second signal may include a power on Vendor ID (VID)/Product ID (PID) signal.

According to various example embodiments, the processor may be configured to: control the external device to recognize the existence of the power supply device through a unique Vendor ID (VID) and/or Product ID (PID) and control the power supply of an external device through VID and/or PID.

According to various example embodiments, the first interface may include a configuration channel integrated circuit (CCIC) configured for CC communication.

Figure 6:
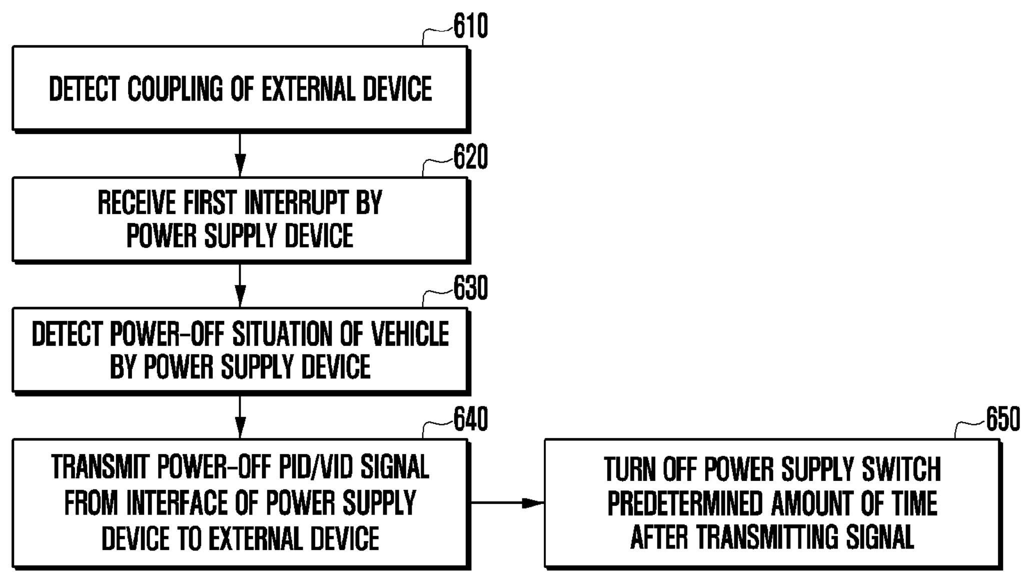
FIG. 6 is a flowchart illustrating an example method of controlling a power supply according to various embodiments.

FIG. 6 is a flowchart illustrating an example method of controlling a power supply according to various embodiments. The illustrated method 600 may be executed by the power supply device (e.g., the power supply device 401 of FIG. 4) described above with reference to FIGS. 1 to 5, and the technical features described above may not be repeated below.

According to various example embodiments, a method of controlling power of a power supply device installed in a vehicle may include: detecting connection of an external device; detecting vehicle power on/off; and transmitting a signal corresponding to vehicle power on/off to an external device. The signal corresponding to vehicle power on/off may include a first signal and/or a second signal. The first signal may include a VID (Vendor ID)/PID (Product ID) signal related to power off. The second signal may include a VID (Vendor ID)/PID (Product ID) signal related to power on.

FIG. 6 is a flowchart illustrating an example method of controlling a power supply device (e.g., the power supply device 401 of FIG. 4) to turn off the power supply of the external device (e.g., the external device 405 of FIG. 4) according to various embodiments. In operation 610, the first processor 421 may detect when the external device 405 is connected to the connector 501 of the power supply device 401. At this time, the power supply device 401 may transmit a device ID (unique VID/PID) to the external device 405. The ID sensing unit 445 of the external device 405 may identify information (e.g., Vendor ID, Product ID) about the power supply device 401 by receiving the device ID from the memory 441. In addition, the external device 405 may transmit a response signal to the first interface 411. The power supply device 401 may identify information (e.g., whether or not an internal battery is included) through a response signal and prepare to transmit the data through the interface and transmit the power through the power supply switch 451. This has been previously described in detail in FIG. 5.

In operation 620, in the case that the vehicle 403 is scheduled to be turned off, the power on/off signal transmitter 423 of the vehicle 403 may transmit a first interrupt to the power supply device 401. The first interrupt may include a signal indicating that the vehicle 403 is scheduled to be turned off. The power supply device 401 may receive the first interrupt, detect a power off situation of the vehicle in operation 630, and control the external device 405 in advance.

In operation 640, the first processor 421 of the power supply device 401 that received the first interrupt may transmit the first signal to the second interface 415 of the external device 405 through the first interface 411. In this case, the first signal may include a Power Off PID/VID signal. The first processor 421 may transmit a first signal to control the external device 405 in a power off mode. The external device 405 may receive the Power Off PID/VID signal and control the system to be in a stand by mode for a power off. Then, the power of the external device 405 may be turned off.

In operation 650, the first processor 421 may cut off the power supplied to the external device 405 by opening the power supply switch 451 after a predetermined period (e.g., about 30 seconds) elapses since transmitting the first signal. At this time, the external device 405 has already received the first signal and is preparing for power off on the system, so that damage due to sudden power supply cutoff may be prevented and/or reduced. In addition, the first processor 421 may cut off the leakage current and avoid power consumption by turning off the power supply switch 451 after a predetermined period elapses since transmitting the first signal.

Figure 7:
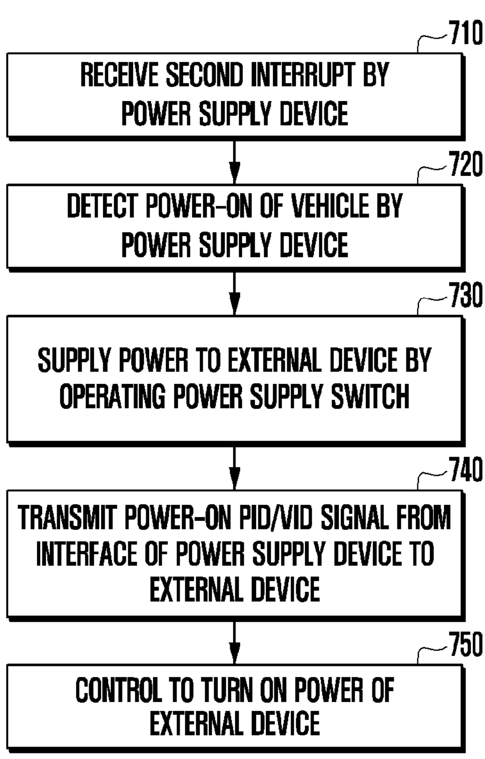
FIG. 7 is a flowchart illustrating an example method of controlling a power supply according to various embodiments.

FIG. 7 is a flowchart illustrating an example method of controlling a power supply according to various embodiments. The illustrated method 700 may be executed by the power supply device (e.g., the power supply device 401 of FIG. 4) described above with reference to FIGS. 1 to 5, and the technical features described above may not be repeated.

FIG. 7 may indicate a situation in which the power supply device (e.g., the power supply device 401 of FIG. 4) controls to turn on the power supply of the external device (e.g., the external device 405 of FIG. 4).

In operation 710, the power on/off signal transmitter 423 of the vehicle 403 may transmit a second interrupt including information about the power on state to the first processor 421 of the power supply device 401.

In operation 720, the power supply device 401 may sense (e.g., detect) the power on situation of the vehicle through a second interrupt. In operation 730, the first processor 421 of the power supply device 401 may control to supply power to the external device 405 after receiving the second interrupt. In operation 740, the first processor 421 may operate the power supply switch 451 to supply power to the second PMIC 435 of the external device 405. At this time, the external device 405 may not be immediately powered on, but it may correspond to an operation stand by state.

In operation 750, the first processor 421 may transfer the second signal to the second interface 415 of the external device 405 through the first interface 411. The second signal may include a power on PID/VID signal. The second processor 425 may operate the external device 405 by receiving the power on PID/VID signal and turning on the power of the external device 405. At this time, after a predetermined period (e.g., 30 seconds) elapses since operating the power supply switch 451 in the first processor 421, the second signal may be transferred to the second interface 415. Alternatively, the first processor 421 may provide a guide for transmitting the second signal to the user and the second signal may be transferred to the second interface 415 according to the user's selection. Through this, when the vehicle 403 is turned on, the power of the external device 405 may not be turned on immediately, but the power of the external device 405 may be turned on when the user desires.

Various embodiments of the present disclosure disclosed herein and in the drawings are merely presented as examples to easily explain the technical content of the present disclosure and aid in the understanding of the present disclosure, but they are not intended to limit the scope of the present disclosure. Therefore, the scope of the present disclosure should be interpreted to include all changes or modifications derived based on the technical ideals of the present disclosure in addition to the embodiments disclosed herein.

According to various embodiments, a method of controlling a power supply device (e.g., a power supply device 401 of FIG. 4) installed in a vehicle may include: detecting connection of an external device (e.g., an external device 405 of FIG. 4); detecting vehicle power on/off; and transmitting a signal corresponding to vehicle power on/off to an external device, wherein the signal corresponding to vehicle power on/off includes a first signal and/or a second signal where the first signal includes a VID (Vendor ID)/PID (Product ID) signal related to power off and the second signal includes a VID (Vendor ID)/PID (Product ID) signal related to power on.

According to various example embodiments, the detecting the connection of the external device may include: transmitting unique Vendor ID and Product ID (VID/PID) of the power supply device and receiving a response from the external device with respect to the Vendor ID and Product ID (VID/PID).

According to various example embodiments, detecting vehicle power on/off may include receiving a first interrupt including a signal according to the power off of the vehicle.

According to various example embodiments, detecting vehicle power on/off may include receiving a second interrupt including a signal according to power on of the vehicle.

According to various example embodiments, the Vendor ID (VID)/Product ID (PID) signal related to power off may control the external device to switch to a power off or a stand by state and Vendor ID (VID)/Product ID (PID) signal related to power on may control the external device to switch to a power on state.

According to various example embodiments, transmitting a signal corresponding to the vehicle power on/off to an external device may include transmitting a first signal corresponding to turning off of a vehicle and an operation of cutting off power to the external device based on a specified period elapsing since transmitting the first signal.

According to various example embodiments, transmitting a signal corresponding to the vehicle power on/off to the external device may include: supplying power to the external device in response to the vehicle power on/off and transmitting a second signal based on a specified period elapsing since supplying the power.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. A power supply device powered by a battery of a vehicle comprising:

a first interface configured to communicate with an external device;

a power supply switch connected to a charging adapter configured to transform power supplied from the battery to control power output; and a processor operatively connected to the first interface and the power supply switch, wherein the first interface includes a USB Type-C interface for configuration channel (CC) communication between the external device and the power supply device; and the processor is configured to:

detect connection of the external device through the first interface, control power supply to the external device through the power supply switch, based on detecting a first interrupt related to vehicle power off from the vehicle, control the power supply device to transmit a first signal for controlling the external device to switch to a stand-by state for power off through the first interface, and cut off power supply to the external device by opening the power supply switch after a predetermined period elapses since transmitting the first signal, and based on detecting a second interrupt related to vehicle power on from the vehicle, supply power to the external device by closing the power supply switch and control, when a predetermined period of time elapses after closing the power supply switch, the power supply device to transmit a second signal for controlling the external device to switch to a power-on state to the external device through the first interface.

2. The power supply device of claim 1, wherein the first interrupt comprises a signal according to the power off of the vehicle.

3. The power supply device of claim 2, wherein the processor is configured to control the power supply device to transmit the first signal to the external device through the first interface based on the first interrupt being received.

4. The power supply device of claim 3, wherein the first signal comprises a power off Vendor ID (VID)/Product ID (PID) signal.

5. The power supply device of claim 4, wherein the processor is configured to control the external device to switch to a power off or a stand by state for power off through the first signal.

6. The power supply device of claim 5, wherein the processor is configured to cut off power supply to the external device by opening the power supply switch based on a specified period elapsing since transmitting the first signal.

7. The power supply device of claim 1, wherein the second interrupt comprises a signal according to a power on of the vehicle.

8. The power supply device of claim 7, wherein the processor is configured to supply power to the external device by closing the power supply switch based on the second interrupt being received.

9. The power supply device of claim 1, wherein the second signal comprises a power on Vendor ID (VID)/Product ID (PID) signal.

10. The power supply device of claim 9, wherein the processor is configured to control the external device to switch to a power on state through the second signal.

11. The power supply device of claim 1, wherein the processor is configured to: control the external device to recognize existence of the power supply device through a unique Vendor ID (VID) and/or Product ID (PID) and control the power supply of an external device through VID and/or PID.

12. The power supply device of claim 1, wherein the first interface comprises a configuration channel integrated circuit (CCIC) for CC communication.

13. A method of controlling a power supply device installed on a vehicle and powered by a vehicle, the power supply device comprising a first interface configured to communicate with an external device, and a power supply switch connected to a charging adapter configured to transform power supplied from a battery to control power output, the method comprising:

detecting connection of an external device;

controlling power supply to the external device through the power supply switch based on detecting a first interrupt related to vehicle power off from the vehicle, transmitting a first signal for controlling the external device to switch to a stand-by state for power off to the external device through the first interface, and cutting off power supply to the external device by opening the power supply switch after a predetermined period elapses since transmitting the first signal; and based on detecting a second interrupt related to vehicle power on from the vehicle, supplying power to the external device by closing the power supply switch and transmitting, when a predetermined period elapses after closing the power supply switch, a second signal for controlling the external device to switch to a power-on state to the external device through the first interface.

14. The method of claim 13, wherein the detecting the connection of an external device comprises: transmitting unique Vendor ID and Product ID (VID/PID) of the power supply device and receiving a response from the external device with respect to the Vendor ID and Product ID (VID/PID).

15. The method of claim 13, wherein the first interrupt includes a signal according to the power off of the vehicle.

16. The method of claim 13, wherein the second interrupt includes a signal according to power on of the vehicle.

17. The method of claim 13, wherein the first signal includes Vendor ID (VID)/Product ID (PID) signal related to the power off that controls the external device to switch to a power off state or a stand by state for power off; and the second signal includes Vendor ID (VID)/Product ID (PID) signal related to the power on that controls the external device to switch to a power on state.

18. The method of claim 13, wherein the first signal is transmitted in response to power off of the vehicle; and power to the external device is cut off based on a specified period elapsing since transmitting the first signal.

19. The power supply device of claim 1, wherein the period of time is preset to 30 seconds.

20. The power supply device of claim 1, wherein the first signal and the second signal are transmitted through a CC pin of the USB Type-C interface.

* * * * *